United States Patent
Hu et al.

(10) Patent No.: US 8,929,461 B2
(45) Date of Patent: Jan. 6, 2015

(54) METHOD AND APPARATUS FOR CAPTION DETECTION

(75) Inventors: Wei Hu, Beijing (CN); Rui Ma, Beijing (CN)

(73) Assignee: Intel Corporation, Santa Clara, CA (US)

( * ) Notice: Subject to any disclaimer, the term of this patent is extended or adjusted under 35 U.S.C. 154(b) by 2180 days.

(21) Appl. No.: 11/736,225

(22) Filed: Apr. 17, 2007

(65) Prior Publication Data

US 2008/0260032 A1    Oct. 23, 2008

(51) Int. Cl.
| G06K 9/00 | (2006.01) |
| G06K 9/72 | (2006.01) |
| G06K 9/32 | (2006.01) |
| H04N 21/488 | (2011.01) |

(52) U.S. Cl.
CPC .............. *G06K 9/3266* (2013.01); *G06K 9/325* (2013.01); *H04N 21/4884* (2013.01)
USPC ....... 375/240.26; 382/172; 382/182; 382/229

(58) Field of Classification Search
CPC ... G06K 9/325; G06K 9/3258; G06K 9/3266; G06K 9/348
USPC ...................... 375/240.26; 382/176, 182, 229
See application file for complete search history.

(56) References Cited

U.S. PATENT DOCUMENTS

| 6,101,274 | A  | * | 8/2000  | Pizano et al. | .................. 382/176 |
| 6,185,329 | B1 | * | 2/2001  | Zhang et al. | ................... 382/176 |
| 6,219,382 | B1 | * | 4/2001  | Kikuchi et al. | ........... 375/240.16 |
| 6,470,094 | B1 | * | 10/2002 | Lienhart et al. | ................ 382/176 |
| 7,738,706 | B2 | * | 6/2010  | Aradhye et al. | ................ 382/182 |
| 7,817,855 | B2 | * | 10/2010 | Yuille et al. | ..................... 382/176 |
| 7,817,856 | B2 | * | 10/2010 | Yoshii et al. | .................... 382/182 |
| 7,929,764 | B2 | * | 4/2011  | Daniels et al. | ................. 382/182 |
| 2002/0196370 | A1 | * | 12/2002 | Dagtas et al. | .................. 348/600 |
| 2004/0125877 | A1 | * | 7/2004  | Chang et al. | ............ 375/240.28 |
| 2004/0170392 | A1 | * | 9/2004  | Lu et al. | ........................... 386/96 |
| 2005/0226503 | A1 | * | 10/2005 | Bailey et al. | ................... 382/173 |
| 2006/0274833 | A1 | * | 12/2006 | Kojokaro et al. | ......... 375/240.16 |
| 2007/0038612 | A1 | * | 2/2007  | Sull et al. | ............................ 707/3 |
| 2007/0044010 | A1 | * | 2/2007  | Sull et al. | .................... 715/500.1 |
| 2007/0201764 | A1 | * | 8/2007  | Jung et al. | ...................... 382/292 |

\* cited by examiner

*Primary Examiner* — Joseph P Hirl
*Assistant Examiner* — Thomas Gyorfi
(74) *Attorney, Agent, or Firm* — Blakely, Sokoloff, Taylor & Zafman LLP

(57) ABSTRACT

Machine-readable media, methods, apparatus and system for caption detection are described. In some embodiments, a plurality of text boxes may be detected from a plurality of frames. A first percentage of the plurality of text boxes whose locations on the plurality of frames fall into a location range may be obtained. A second percentage of the plurality of text boxes whose sizes fall into a size range may be obtained. Then, it may be determined if the first percentage and the location range are acceptable and if the second percentage and the size range are acceptable.

20 Claims, 4 Drawing Sheets

METHOD AND APPARATUS FOR CAPTION DETECTION

BACKGROUND

The rapid growth of video data may lead to a demand for content-based retrieving system, including one or a combination of image, audio and textual information in the videos. Several text detection approaches for videos are proposed in the art. For example, text boxes may be retrieved from video frames based upon corner points and region edges of candidate text area. The retrieved text boxes may contain captions and non-captions. Captions (e.g., subtitles) may provide important information for video indexing, retrieval, mining and understanding.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE PREFERRED EMBODIMENTS

The following description describes techniques for caption detection. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
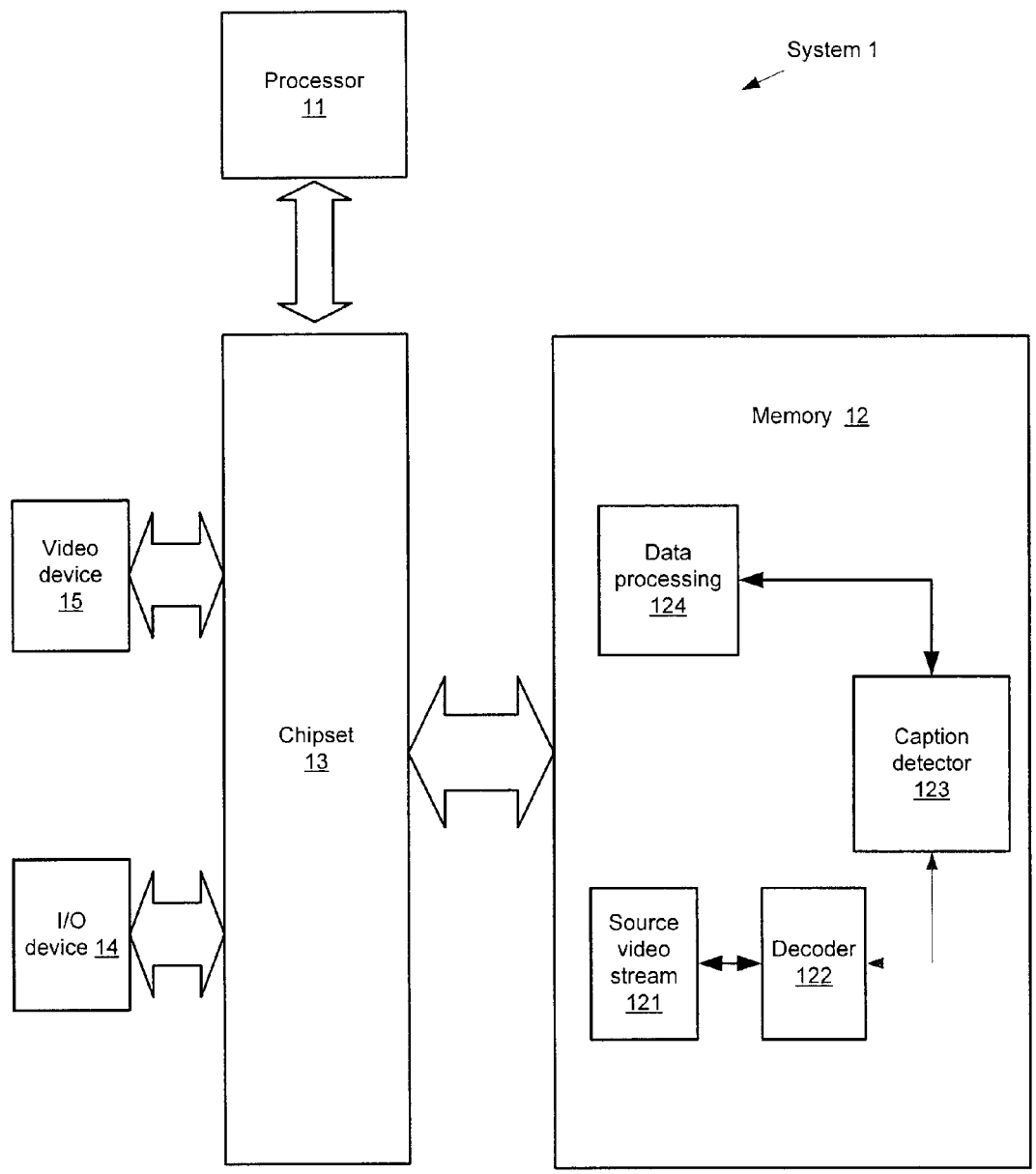
FIG. 1 is an embodiment of a system having a caption detector.

FIG. 1 shows an embodiment of a system 1. Examples for the system may comprise distributed computing systems, supercomputers, computing clusters, mainframe computers, mini-computers, client-server systems, personal computers, workstations, portable computers, laptop computers, mobile phones or personal data assistants (PDA), or other device capable for data transceiving and processing.

In an embodiment, the comprise system may comprise one or more processors 11, memory 12, chipset 13, I/O devices 14, video device 15 and possibly other components for data transceiving and processing.

Processors 11 are communicatively coupled to various components (e.g., the memory 12) via one or more buses such as a processor bus. Processors 11 may be implemented as an integrated circuit (IC) with one or more processing cores that may execute codes under a suitable architecture, for example, including Intel® Xeon™, Intel® Pentium™, Intel® Itanium™ architectures, available from Intel Corporation of Santa Clara, Calif.

Memory 12 may store codes to be executed by processor 11. In an embodiment, memory 12 may store the source video stream 121 input from various channels such as I/O devices 14, an decoder 122 to decode the source video stream into a plurality of frames under various video coding standards, such as MPEG-1, MPEG-2, MPEG-4, H.261, H.263, H.264, AVS (video); a caption detector 123 to detect caption boxes from the frames; a data processing logic 124 to process the detected captions for displaying at a video device 15.

Chipset 13 may provide one or more communicative path among processors 11, memory 12, I/O devices 14, video device 15, and possibly other components. I/O devices 14 may input or output data to or from the system 1, such as video data. Examples for the I/O devices 14 may comprise a network card, a blue-tooth device, an antenna, and possibly other devices for transceiving data. Video device 15 may display videos on a display screen (not shown).

Figure 2:
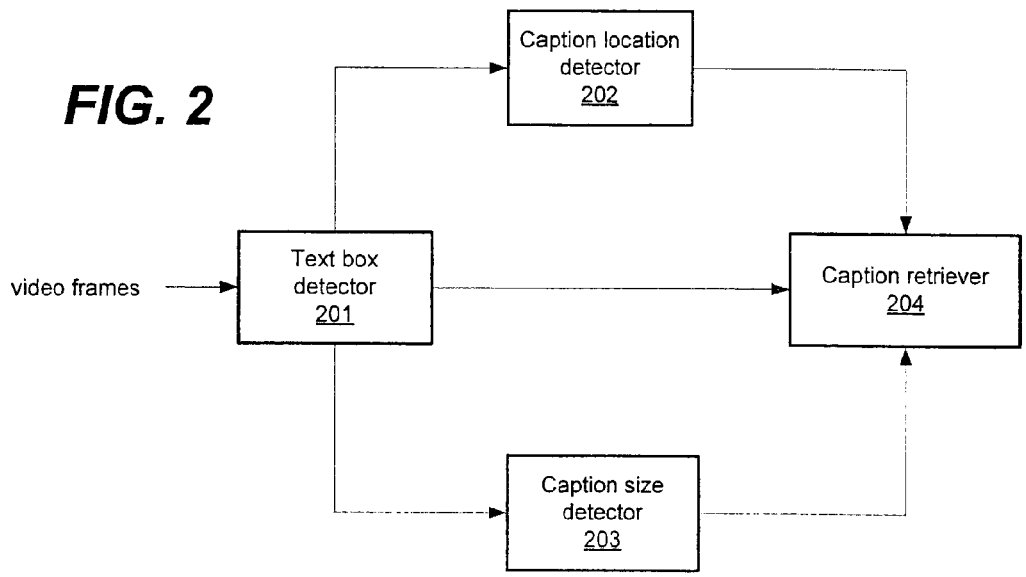
FIG. 2 is an embodiment of the caption detector.

FIG. 2 shows an embodiment of caption detector 123. Caption detector 123 may comprise text box detector 201, caption location detector 202, caption size detector 203 and caption retriever 204. Text box detector 201 may detect text boxes for the video frames. Various schemes may be applied to text box detection, such as the above-mentioned corner points/region edges scheme. The detected text boxes may comprise caption boxes or non-caption boxes.

Caption location detector 202 may detect if an acceptable percentage of the text boxes locate on an acceptable range of locations of the frames and may output the location range if so. For example, caption location detector 202 may detect the percentage of the text boxes whose locations on the frames fall into a certain range and may determine that the percentage is acceptable if it is equal to or larger than a predetermined value. Caption location detector 202 may further determine that the location range is acceptable if it is equal to or smaller than another predetermined value. The location range may be used by the caption retriever 204 to retrieve caption boxes from the text boxes.

Caption size detector 203 may detect if an acceptable percentage of the text boxes have sizes (heights or widths) within an acceptable range and may output the size range if so. Caption size detector may detect the percentage of the text boxes whose heights (if the captions are aligned horizontally) or widths (if the captions are aligned vertically) fall into a certain range and may determine that the percentage is acceptable if it is equal to or larger than a predetermined value. Caption size detector 202 may further determine that the size range is acceptable if it is equal to or smaller than another predetermined value. The size range may be used by the caption retriever 204 to retrieve caption boxes from the text boxes.

Caption retriever 204 may retrieve the caption boxes from the text boxes if the caption boxes locates within the location range detected by caption location detector 202 and have sizes within the size range detected by caption size detector 203.

Figure 3:
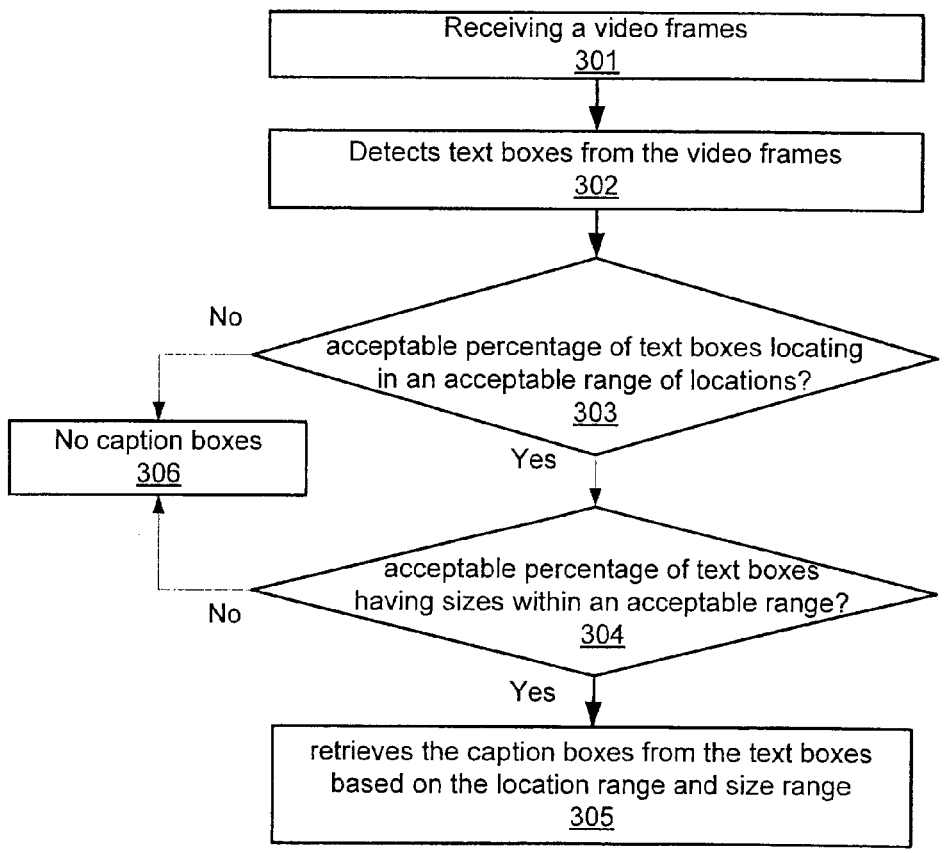
FIG. 3 is an embodiment of a method of detecting caption boxes for a video stream.

FIG. 3 shows an embodiment of a method of detecting caption boxes for videos. In block 301, caption detector 123 may receive a plurality of video frames decoded from a source video stream. In block 302, caption detector 123 may retrieve text boxes from the video frames. In block 303, caption detector 123 may determine if an acceptable percentage of the text boxes locate on an acceptable range of locations of the frames, and in block 304, caption detector 123 may determine if an acceptable percentage of the text boxes have sizes within an acceptable range. If so, then in block 305, caption detector 123 may retrieve caption boxes that may locate within the location range and have sizes within the size range from the text boxes. However, if not, then in block 306, caption detector 123 may determine that the detected text boxes may not include caption boxes.

Figure 4:
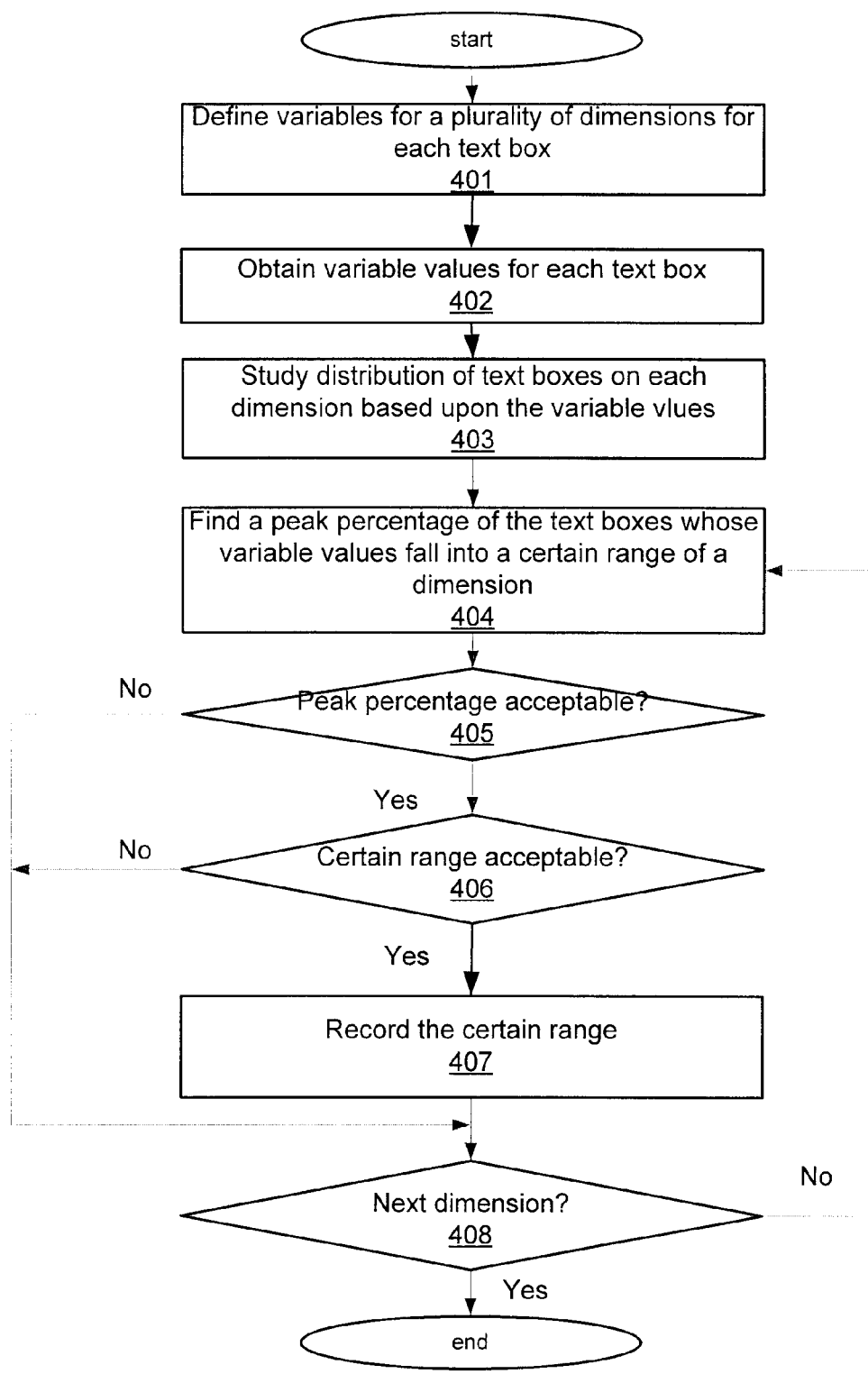
FIG. 4 is an embodiment of a method of determining caption locations and sizes.

FIG. 4 shows an embodiment of a method of implementing blocks 303 and 304 in FIG. 3. In block 401, caption detector 123 may define variables on a plurality of dimensions for each text box. Each variable may correspond to each dimension. For example, caption detector 123 may define variables $X_L$ and $Y_L$ representing x and y coordinates of an upper left point of a text box, variables $X_R$ and $Y_R$ representing x and y coordinates of a lower right point of the text box, variables $X_C$ and $Y_C$ representing x and y coordinates of a central point of the text box and variables Width and Height representing width and height of the text box. With those variables, caption detector 123 may basically know how the text box locates on the frames and how the text box sizes. It should be appreciated that any number of the above-described variables may be used or other variables may be used in order to get the location and size information of the text box.

Figure 5:
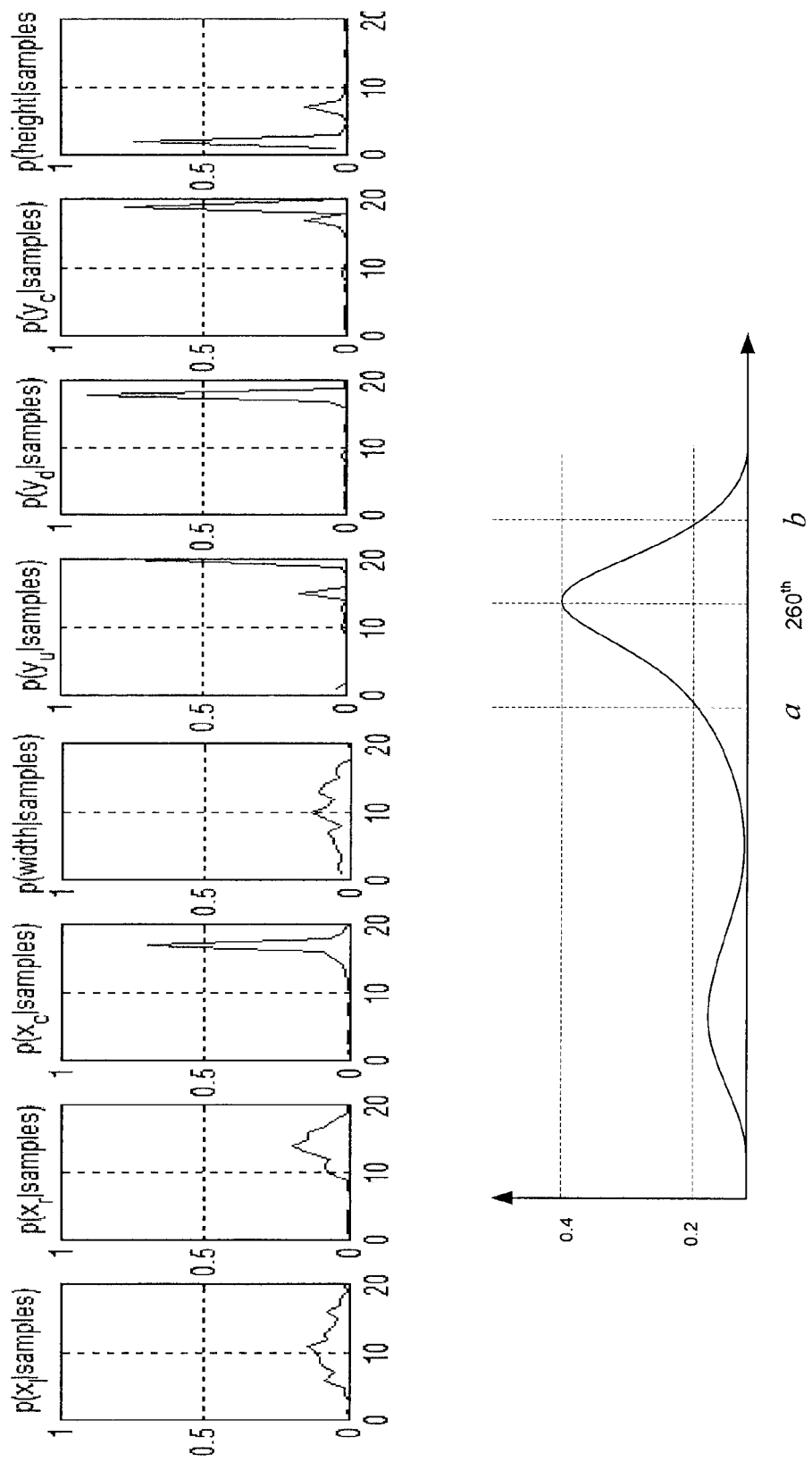
FIG. 5 is an example of implementing the method of FIG. 4.

In block 402, caption detector 123 may obtain each variable value for each text box. In block 403, caption detector 123 may study how the text boxes distribute on each dimension based upon the variable values. FIG. 5 shows distributions of the text boxes on eight dimensions (i.e., $X_L$, $Y_L$, $X_R$, $Y_R$, $X_C$, $Y_C$, Width and Height). Each histogram in the upper part of FIG. 5 corresponds to one dimension. X axis (or horizontal axis) of the histogram may represent a bin number, in which a frame may be horizontally or vertically divided into a number of bins (e.g., 20 bins) and each bin may comprise an equal number of pixels. Y axis (or vertical axis) may represent a percentage of the text boxes. For example, the third diagram shows approximately 70% of the text boxes whose horizontal central points ($X_C$) locate in the 17th bin of the frames.

In block 404, caption detector 123 may find a peak percentage of the text boxes whose variable values may fall into a certain range on that dimension. For example, according to the third histogram, the peak percentage may be 0.7. Then, in block 405, caption detector 123 may determine if the peak percentage is acceptable. Caption detector 123 may compare the peak percentage with a predetermined value (e.g., an empirical value) and determine the peak percentage is acceptable if it is equal to or larger than the predetermined value.

If the peak percentage is acceptable, then caption detector 123 may determine if the certain range is acceptable in block 406. Many technologies could be used for the determination. For example, caption detector 13 may determine if the range defined by the 17th bin is acceptable. Caption detector 13 may determine the range is acceptable if it is equal to or smaller than another predetermined value (e.g., another empirical value).

If the certain range is acceptable, caption detector 123 may record the certain range for that dimension in block 407. If either the peak percentage or the certain range is unacceptable, caption detector 123 may skip that dimension and move to a next dimension in block 408. As a result of FIG. 4, caption detector 123 may be able to obtain the location information and the size information for the caption candidates.

Other technologies may implement other embodiments for the method of FIG. 4. In an embodiment, caption detector 13 may determine the caption locations and sizes based upon location/size analysis of a part of the text boxes, instead of all of the text boxes.

In another embodiment, caption detector 13 may perform a refine study about distribution of the text boxes in a certain area of one dimension (e.g., the 17th bin of dimension $X_L$), as shown in the lower part of FIG. 5. X axis of the diagram may represent a pixel number in X or Y direction. For example, if the 17th bin contains 20 pixels in the X direction, then X axis may show these 20 pixels in details. Y axis may represent percentage of the text boxes, e.g., approximately 40% of the text boxes locating on the $260^{th}$ pixel in the X direction.

According to the lower part of FIG. 5, caption detector 123 may define a percentage range (e.g., the percentage range between 0.2 and 0.4) that may cover a peak percentage of the text boxes locating on a certain position of the frames (e.g., 40% of the text boxes locating on the 260th pixel in the X direction). Meanwhile, the lowest point of the percentage range should be equal to or larger than a predetermined value (e.g., an empirical value).

Then, caption detector 123 may determine if a location range (e.g., the location range between points a and b) corresponding to the percentage range is acceptable. Caption detector 123 may determine that the location range is acceptable if it is equal to or smaller than another predetermined value (e.g., another empirical value). Caption detector 123 may record the location range if it is acceptable, and may skip the dimension if the location range is unacceptable.

Although the current invention has been described in conjunction with certain embodiments, it shall be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   detecting a plurality of text boxes from a plurality of video frames, wherein detecting includes obtaining a first percentage of the plurality of text boxes whose locations associated with the plurality of the video frames fall within a location range, wherein the first percentage and the location range are regarded as acceptable if the first percentage is equal to or greater than a first determined value and if the location range is equal to or less than a second predetermined value, and obtaining a second percentage of the plurality of text boxes whose sizes fall within a size range, wherein the second percentage and the size range are regarded as acceptable if the second percentage is equal to or greater than a third predetermined value and if the size range is equal to or less than a fourth predetermined value;

identifying a text box of the plurality of text boxes as a caption candidate if the first percentage, the location range, the second percentage, and the size range relating to the text box are acceptable; and selecting the identified text box as the caption candidate.

2. The method of claim 1, further comprising:

comparing the first percentage with the first predetermined value;

comparing the location range with the second predetermined value;

comparing the second percentage with the third predetermined value; and comparing the size range with the fourth predetermined value, wherein the size range includes a height range or a width range.

3. The method of claim 1, wherein obtaining the first percentage comprises:

obtaining a plurality of first percentages relating to the plurality of text boxes having a plurality of locations on the plurality of video frames, wherein each of the plurality of first percentages corresponds to each of the plurality of locations;

determining a first percentage range based upon the plurality of first percentages, wherein the first percentage range covers a highest first percentage from the plurality of first percentages;

determining a lowest first percentage from the first percentage range as the first percentage; and determining the location range based upon the plurality of locations, wherein the location range corresponds to the first percentage range.

4. The method of claim 1, wherein detecting further comprises:

defining variable values corresponding to a plurality dimensions for each of the plurality of text boxes;

determining distribution of the plurality of text boxes on each dimension based on its corresponding defined variable value;

finding a peak percentage associated with one or more text boxes of the plurality of text boxes whose corresponding variable values fall within a plurality of dimension ranges, wherein the peak percentage is compared with a predetermined value, and wherein the peak percentage is regarded as acceptable if it is equal to or greater than the predetermined value;

identifying a dimension range of the plurality of dimension ranges as a dedicated dimension range if the peak percentage associated with the dimension range is regarded as acceptable; and selecting the identified dimension range as the dedicated dimension range.

5. The method of claim 4, further comprising:

dividing the variable values into a plurality of bins;

placing each of the plurality of text boxes into one of the plurality of bins corresponding to its variable value, identifying a bin from the plurality of bins into which a highest percentage of text boxes was placed; and identifying a text box of the plurality of text boxes as a caption candidate if a percentage associated with the text box is a highest percentage and is regarded as acceptable for being equal to or greater than the first determined value or a predetermined threshold percentage.

6. The method of claim 5, further comprising:

selecting a range of values within the bin, wherein the range straddles a value corresponding to the highest percentage and wherein ends of the range correspond to a predetermined second percentage of text boxes that is less than the highest percentage, and wherein determining that a text box placed in the bin is a caption is further in response to determining that a width of the range is less than a second threshold value.

7. The method of claim 5, wherein a variable value comprises an x-coordinate of an upper left corner, a y-coordinate of the upper left corner, an x-coordinate of an upper right corner, a y-coordinate of the upper right corner, an x-coordinate of a center point, and a y-coordinate of the center point.

8. An apparatus comprising:

a computing device having a storage medium to store instructions, and a processing device to execute the instructions, the computing device further having a mechanism to, when the instructions are executed, perform one or more operations comprising:

detecting a plurality of text boxes from a plurality of video frames, wherein detecting includes obtaining a first percentage of the plurality of text boxes whose locations associated with the plurality of the video frames fall within a location range, wherein the first percentage and the location range are regarded as acceptable if the first percentage is equal to or greater than a first determined value and if the location range is equal to or less than a second predetermined value, and obtaining a second percentage of the plurality of text boxes whose sizes fall within a size range, wherein the second percentage and the size range are regarded as acceptable if the second percentage is equal to or greater than a third predetermined value and if the size range is equal to or less than a fourth predetermined value;

identifying a text box of the plurality of text boxes as a caption candidate if the first percentage, the location range, the second percentage, and the size range relating to the text box are acceptable; and selecting the identified text box as the caption candidate.

9. The apparatus of claim 8, wherein the one or more operations further comprise:

comparing the first percentage with the first predetermined value;

comparing the location range with the second predetermined value;

comparing the second percentage with the third predetermined value; and comparing the size range with the fourth predetermined value, wherein the size range includes a height range or a width range.

10. The apparatus of claim 8, wherein obtaining the first percentage comprises:

obtaining a plurality of first percentages relating to the plurality of text boxes having a plurality of locations on the plurality of video frames, wherein each of the plurality of first percentages corresponds to each of the plurality of locations;

determining a first percentage range based upon the plurality of first percentages, wherein the first percentage range covers a highest first percentage from the plurality of first percentages;

determining a lowest first percentage from the first percentage range as the first percentage; and determining the location range based upon the plurality of locations, wherein the location range corresponds to the first percentage range.

11. The apparatus of claim 8, wherein when detecting, the one or more operations further comprise:

defining variable values corresponding to a plurality dimensions for each of the plurality of text boxes;

determining distribution of the plurality of text boxes on each dimension based on its corresponding defined variable value;

finding a peak percentage associated with one or more text boxes of the plurality of text boxes whose corresponding variable values fall within a plurality of dimension ranges, wherein the peak percentage is compared with a predetermined value, and wherein the peak percentage is regarded as acceptable if it is equal to or greater than the predetermined value;

identifying a dimension range of the plurality of dimension ranges as a dedicated dimension range if the peak percentage associated with the dimension range is regarded as acceptable; and selecting the identified dimension range as the dedicated dimension range.

12. The apparatus of claim 11, wherein the one or more operations further comprise:

dividing the variable values into a plurality of bins;

placing each of the plurality of text boxes into one of the plurality of bins corresponding to its variable value, identifying a bin from the plurality of bins into which a highest percentage of text boxes was placed; and identifying a text box of the plurality of text boxes as a caption candidate if a percentage associated with the text box is a highest percentage and is regarded as acceptable for being equal to or greater than the first determined value or a predetermined threshold percentage.

13. The apparatus of claim 12, wherein the one or more operations further comprise:

selecting a range of values within the bin, wherein the range straddles a value corresponding to the highest percentage and wherein ends of the range correspond to a predetermined second percentage of text boxes that is less than the highest percentage, and wherein determining that a text box placed in the bin is a caption is further in response to determining that a width of the range is less than a second threshold value, wherein a variable value comprises an x-coordinate of an upper left corner, a y-coordinate of the upper left corner, an x-coordinate of an upper right corner, a y-coordinate of the upper right corner, an x-coordinate of a center point, and a y-coordinate of the center point.

14. A machine-readable medium having stored thereon instructions, which when executed, cause a processing device to perform one or more operations comprising:

detecting a plurality of text boxes from a plurality of video frames, wherein detecting includes obtaining a first percentage of the plurality of text boxes whose locations associated with the plurality of the video frames fall within a location range, wherein the first percentage and the location range are regarded as acceptable if the first percentage is equal to or greater than a first determined value and if the location range is equal to or less than a second predetermined value, and obtaining a second percentage of the plurality of text boxes whose sizes fall within a size range, wherein the second percentage and the size range are regarded as acceptable if the second percentage is equal to or greater than a third predetermined value and if the size range is equal to or less than a fourth predetermined value;

identifying a text box of the plurality of text boxes as a caption candidate if the first percentage, the location range, the second percentage, and the size range relating to the text box are acceptable; and selecting the identified text box as the caption candidate.

15. The machine-readable medium of claim 14, wherein the one or more operations further comprise:

comparing the first percentage with the first predetermined value;

comparing the location range with the second predetermined value;

comparing the second percentage with the third predetermined value; and comparing the size range with the fourth predetermined value, wherein the size range includes a height range or a width range.

16. The machine-readable medium of claim 14, wherein obtaining the first percentage comprises:

obtaining a plurality of first percentages relating to the plurality of text boxes having a plurality of locations on the plurality of video frames, wherein each of the plurality of first percentages corresponds to each of the plurality of locations;

determining a first percentage range based upon the plurality of first percentages, wherein the first percentage range covers a highest first percentage from the plurality of first percentages;

determining a lowest first percentage from the first percentage range as the first percentage; and determining the location range based upon the plurality of locations, wherein the location range corresponds to the first percentage range.

17. The machine-readable medium of claim 14, wherein when detecting, the one or more operations further comprise:

defining variable values corresponding to a plurality dimensions for each of the plurality of text boxes;

determining distribution of the plurality of text boxes on each dimension based on its corresponding defined variable value;

finding a peak percentage associated with one or more text boxes of the plurality of text boxes whose corresponding variable values fall within a plurality of dimension ranges, wherein the peak percentage is compared with a predetermined value, and wherein the peak percentage is regarded as acceptable if it is equal to or greater than the predetermined value;

identifying a dimension range of the plurality of dimension ranges as a dedicated dimension range if the peak percentage associated with the dimension range is regarded as acceptable; and selecting the identified dimension range as the dedicated dimension range.

18. The machine-readable medium of claim 17, wherein the one or more operations further comprise:

dividing the variable values into a plurality of bins;

placing each of the plurality of text boxes into one of the plurality of bins corresponding to its variable value, identifying a bin from the plurality of bins into which a highest percentage of text boxes was placed; and identifying a text box of the plurality of text boxes as a caption candidate if a percentage associated with the text box is a highest percentage and is regarded as acceptable for being equal to or greater than the first determined value or a predetermined threshold percentage.

19. The machine-readable medium of claim 18, wherein the one or more operations further comprise:

selecting a range of values within the bin, wherein the range straddles a value corresponding to the highest percentage and wherein ends of the range correspond to a predetermined second percentage of text boxes that is less than the highest percentage, and wherein determining that a text box placed in the bin is a caption is further in response to determining that a width of the range is less than a second threshold value.

20. The machine-readable medium of claim 18, wherein a variable value comprises an x-coordinate of an upper left corner, a y-coordinate of the upper left corner, an x-coordinate of an upper right corner, a y-coordinate of the upper right corner, an x-coordinate of a center point, and a y-coordinate of the center point.

* * * * *